(12) United States Patent
Teraguchi (10) Patent No.: US 8,290,732 B2
(45) Date of Patent: Oct. 16, 2012

(54) ABSOLUTE TYPE LINEAR ENCODER AND METHOD FOR ADJUSTING POSITION THEREOF

(75) Inventor: Mikiya Teraguchi, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 338 days.

(21) Appl. No.: 12/726,033

(22) Filed: Mar. 17, 2010

(65) Prior Publication Data

US 2010/0241383 A1    Sep. 23, 2010

(30) Foreign Application Priority Data

Mar. 17, 2009 (JP) ................................. 2009-064918

(51) Int. Cl.
*G06F 19/00* (2011.01)
(52) U.S. Cl. .......................................... 702/94
(58) Field of Classification Search ...................... 702/94
See application file for complete search history.

(56) References Cited

U.S. PATENT DOCUMENTS

2006/0232311 A1* 10/2006 Kitayama ..................... 327/172

FOREIGN PATENT DOCUMENTS

JP       A-2006-3307        1/2006

* cited by examiner

*Primary Examiner* — Tung S Lau
(74) *Attorney, Agent, or Firm* — Oliff & Berridge, PLC (57) ABSTRACT

An absolute type linear encoder includes: a scale including a plurality of tracks including a high-order and low-order tracks; and a detection head configured to detect a relative position to the scale; and a processing circuit configured to obtain the number of cycles of the low-order track by using a correction value obtained per correction pitch, the width of which is wider than the detection pitch, based on an error between tracks produced by a difference between the position of the high-order track to the detection head and the position of the low-order track thereto, output values of the high-order track and the low-order track, and a cyclic ratio of the low-order track to the high-order track, and obtain the position of the detection head to the scale based on the number of the cycles and the output value of the low-order track.

15 Claims, 8 Drawing Sheets

ABSOLUTE TYPE LINEAR ENCODER AND METHOD FOR ADJUSTING POSITION THEREOF

CROSS-REFERENCE TO RELATED APPLICATIONS

This application is based upon and claims the benefit of priority from Japanese Patent Application No. 2009-064918, filed Mar. 17, 2009, the entire contents of which are incorporated herein by reference.

BACKGROUND

1. Field of the Invention

The present invention relates to an absolute type linear encoder of a so-called separate model, which includes a scale having a plurality of tracks, which include at least one of optical grids, electrode plates, magnetized magnetic bodies and electromagnetic induction coils each of which are continuously disposed at specified intervals along a measurement axis, and a detection head for detecting the relative position in relation to the scale, and is capable of adjusting the relative postures of the scale and the detection head when mounting the scale and the detection head on a machine that becomes an application object, and in particular, relates to an absolute type linear encoder capable of shortening the number of steps of adjusting the positional relationship between a scale and a detection head, and a method for adjusting the position thereof.

2. Description of the Related Art

As a linear encoder for feedback, which is used in a machine tool, etc., an absolute type linear encoder has generally been used, which is capable of detecting the absolute position when power is turned on.

In the absolute type linear encoder, there is a unit type (called an assembly type) having a mechanical structure by which the relative positions of a scale and a detection head are retained. Even when mounting such a unit type encoder in machine equipment such as a machine tool, this does not require any positional adjustment of the scale and the detection head of the absolute type linear encoder, and does not require adjustment of sift length with respect to offset, amplitude and phase of phase 2 sine-wave signal that is the output signal of the detection head and phase shifting between a plurality of tracks, which are produced by the change of the potion, after it is mounted because the relative positions of the scale and the detection head are retained.

Also, as the absolute type linear encoder, there is a separate type in which the scale and the detection head are separated from each other, differing from the unit type described above. This requires mechanical adjustment of the scale and the detection head with respect to the positional relationship and electric adjustment of sift length with respect to offset, amplitude and phase of phase 2 sine-wave signal detected by the detection head and phase shifting between a plurality of tracks thereafter when mounting the linear encoder in machine equipment such as a machine tool, etc.

Since, in the separate type, the scale and the detection head are separate from each other, several advantages are brought about, for example, the degree of freedom in assembly in machine equipment such as a machine tool, etc., is high, downsizing of the machine equipment can be achieved, there is no detection error due to the mechanical structure for retaining the relative positions thereof, and the design is not spoiled. However, it is necessary to combine two or more tracks (sets) of scales in the absolute type linear encoder. That is, in order to carry out highly accurate position detection, it is necessary to perform mechanical position adjustment having high accuracy with respect to a plurality of tracks and to reproduce the initial positional relationship (for example, the positional relationship in temporary assembly when shipping from a factory, for checking the precision).

Therefore, the present inventor has proposed a method for correcting the assembly position and adjusting data, which is shown in JP-A-2006-3307. JP-A-2006-3307 attempts to secure the initial positional accuracy (for example, the accuracy when shipping from a factory) by performing adjustment with respect to the obtained positional data based on the correction data held in an internal memory of a detection head and performing the correction of sift length with respect to offset, amplitude and phase of the detected signal after mechanically adjusting the detection head so as to obtain sufficient output from the detection head when assembling the detection head.

Generally, it is necessary to make the predetermined pitch (the cycle) of the least significant track, for example, the smallest pitch of the optical grid provided on the track, small in order to improve the resolution power and accuracy of an absolute type linear encoder, and it is necessary to lengthen the length of position detection of the most significant track in order to enlarge the detection distance of the absolute type linear encoder. These factors are achieved by increasing the cyclic ratio (track ratio) of the low-order track to the high-order track. However, if the track ratio is increased, the tolerance for mechanical adjustment between the scale and the detection head is reduced. At that time, since the length of the position detection of the most significant track is made longer, it becomes difficult to secure mechanical straightness over the entire scale length.

In JP-A-2006-3307, since the mechanical adjustment is carried out again if necessary even after electric signals are adjusted, the adjustment behavior is not easily converged in relation to the positional accuracy, wherein there is a fear that the positional adjustment is cumbersome. That is, there is a problem that the tolerance of mechanical adjustment between the scale and the detection head in the moving direction X of the scale cannot be increased.

SUMMARY

An object of the invention is to provide an absolute type linear encoder capable of increasing the tolerance of mechanical positional adjustment between a scale and a detection head while enabling highly accurate position detection, and a method for adjusting the position thereof.

According to an aspect of the invention, there is provided an absolute type linear encoder including: a scale including a plurality of tracks including a high-order track and a low-order track; and a detection head configured to detect a relative position to the scale, a relative posture of the scale to the detection head being adjusted when attaching the scale and the detection head to machine equipment that becomes an application object, the detection head receiving an output outputted from the low-order track at a plurality of cycles for the entire length of the scale to the high-order track; and a processing circuit configured to obtain the number of cycles of the low-order track by using a correction value obtained at intervals of correction pitches, the width of which is wider than the detection pitch, based on an error between tracks produced by a difference between the position of the high-order track to the detection head and the position of the low-order track thereto when the position of the detection head is detected at intervals of predetermined detection pitches for the position correction thereof, an output value of the high-order track, an output value of the low-order track, and a cyclic ratio of the low-order track to the high-order track, and obtain the position of the detection head to the scale based on the number of the cycles and the output value of the low-order track.

When both the output value of the high-order track and the output value of the low-order track are made into a phase amount normalized with the maximum value regarded as 1, the error between tracks may be a value obtained by subtracting a value made into an integral number by rounding off a differential value, which is obtained by subtracting the output value of the low-order track from a value obtained by multiplying the cyclic ratio of the low-order track to the high-order track by the output value of the high-order track, from the differential value, and the correction value may be a value obtained by averaging the error between tracks obtained at the detection pitch in the correction pitch.

The detection pitch and the correction pitch may be obtained by using the output value of the high-order track as a reference.

When both the output value of the high-order track and the output value of the low-order track are made into a phase amount normalized with the maximum value regarded as 1, the number of the cycles of the low-order track may be obtained in the processing circuit as a value made into an integral number by rounding off a value obtained by subtracting the output value of the low-order track and the correction value from a value obtained by multiplying the cyclic ratio of the low-order track to the high-order track by the output value of the high-order track.

The absolute type linear encoder may further include a memory circuit connected to the processing circuit, in which the correction value is stored.

The absolute type linear encoder may further include a peripheral communication circuit configured to input the correction value obtained outside into the processing circuit.

A threshold value and an offset value may be provided with respect to the error between tracks. The offset value may be changed in conjunction with the magnitude of the error between tracks obtained in the last time position detection at least a detection pitch to correct the position in the correction pitch when the error between tracks exceeds the threshold value. The error between tracks may be changed by adding the changed offset value to the error between tracks.

According to another aspect of the invention, there is provided a method for adjusting the position of an absolute type linear encoder that includes: a scale including a plurality of tracks including a high-order track and a low-order track; and a detection head configured to detect a relative position to the scale, a relative posture of the scale to the detection head being adjusted when attaching the scale and the detection head to machine equipment that becomes an application object, the detection head receiving an output outputted from the low-order track at a plurality of cycles for the entire length of the scale to the high-order track, the method including: performing position detection at a detection pitch for position correction of the detection head; obtaining a correction value per correction pitch, the width of which is wider than the detection pitch, based on an error between tracks produced by a difference between the position of the high-order track to the detection head and the position of the low-order track thereto at this time; and obtaining the number of cycles of the low-order track using the output value of the high-order track, the output value of the low-order track, the cyclic ratio of the low-order track to the high-order track, and the correction value.

When both the output value of the high-order track and the output value of the low-order track are made into a phase amount normalized with the maximum value regarded as 1, the error between tracks may be obtained as a value obtained by subtracting a value made into an integral number by rounding off a differential value, which is obtained by subtracting the output value of the low-order track from a value obtained by multiplying the cyclic ratio of the low-order track to the high-order track by the output value of the high-order track, from the differential value, and the correction value may be obtained as a value obtained by averaging the error between tracks obtained at the detection pitch in the correction pitch.

The detection pitch and the correction pitch may be obtained by using the output value of the high-order track as a reference.

When both the output value of the high-order track and the output value of the low-order track are made into a phase amount normalized with the maximum value regarded as 1, the number of the cycles of the low-order track may be obtained as a value made into an integral number by rounding off a value obtained by subtracting the output value of the low-order track and the correction value from a value obtained by multiplying the cyclic ratio of the low-order track to the high-order track by the output value of the high-order track.

12. The method may further includes: providing a threshold value and an offset value with respect to the error between tracks, and changing the offset value in conjunction with the magnitude of the error between tracks obtained in the last time position detection at least a detection pitch to correct the position in the correction pitch when the error between tracks exceeds the threshold value; and changing the error between tracks by adding the changed offset value to the error between tracks.

The magnitude of the error between tracks obtained in the last time position detection may be determined by one or more flags.

According to the above, the tolerance for mechanical positional adjustment between a scale and a detection head can be increased while enabling highly accurate position detection. That is, the scale of the absolute type linear encoder and the detection head thereof must be attached to machine equipment at a positional relationship greatly different from the initial positional relationship (for example, the accuracy when shipping from a factory), mechanical re-adjustment becomes unnecessary, the position adjustment may be carried out by using the correction value, so that highly accurate position detection is enabled.

That is, it is possible to reduce the number of steps of adjustment of the positional relationship between the scale and the detection head. In addition, since the machining accuracy of the surface of machine equipment on which the scale and the detection head are attached can be relaxed, attaching thereof can be achieved at a low cost. Further, since there will be no case where an erroneous absolute position is detected, it is possible to improve the reliability in position detection.

BRIEF DESCRIPTION OF THE DRAWINGS

The present invention will become more fully understood from the detailed description given hereinbelow and the accompanying drawing which is given by way of illustration only, and thus is not imitative of the present invention and wherein.

DETAILED DESCRIPTION OF THE INVENTION

Hereinafter, a detailed description is given of one example of embodiments of the present invention with reference to the drawings.

Figure 1:
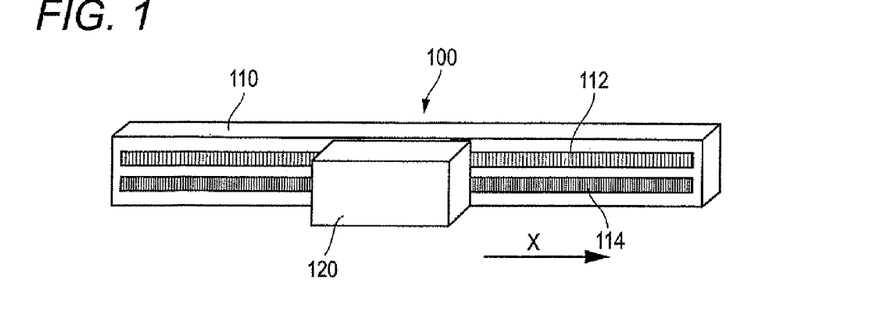
FIG. 1 is a general perspective view of an absolute type linear encoder according to Embodiment 1 of the present invention.
Figure 2A:
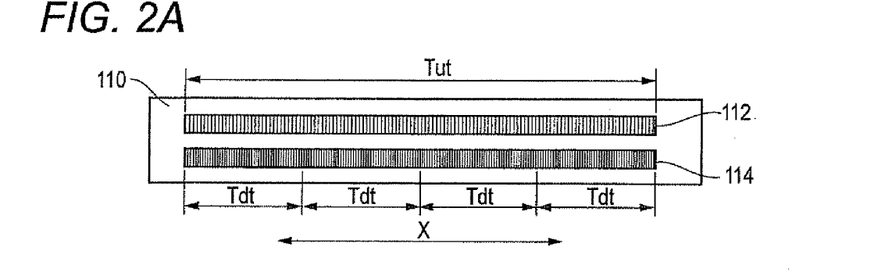
FIGS. 2A and 2B are schematic views of the scale and the detection head of the absolute type linear encoder according to Embodiment 1 of the present invention.
Figure 2B:
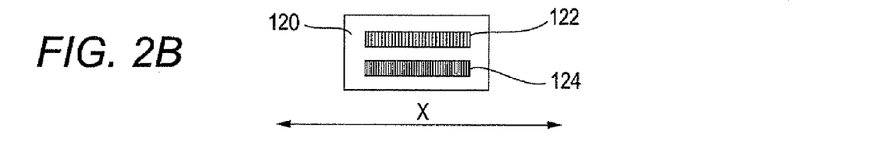
Figure 3:
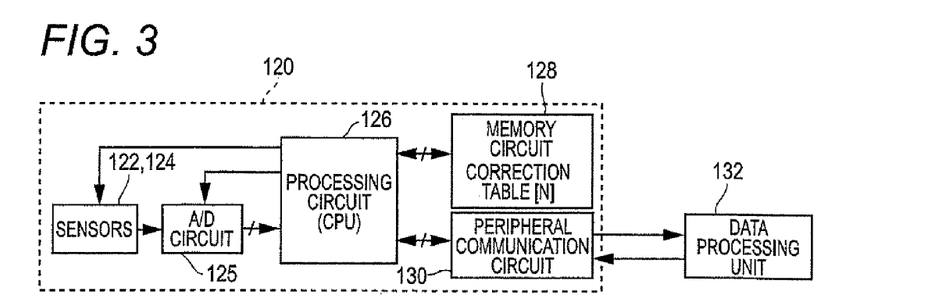
FIG. 3 is a schematic block diagram of the detection head of the absolute type linear encoder according to Embodiment 1 of the present invention.
Figure 4:
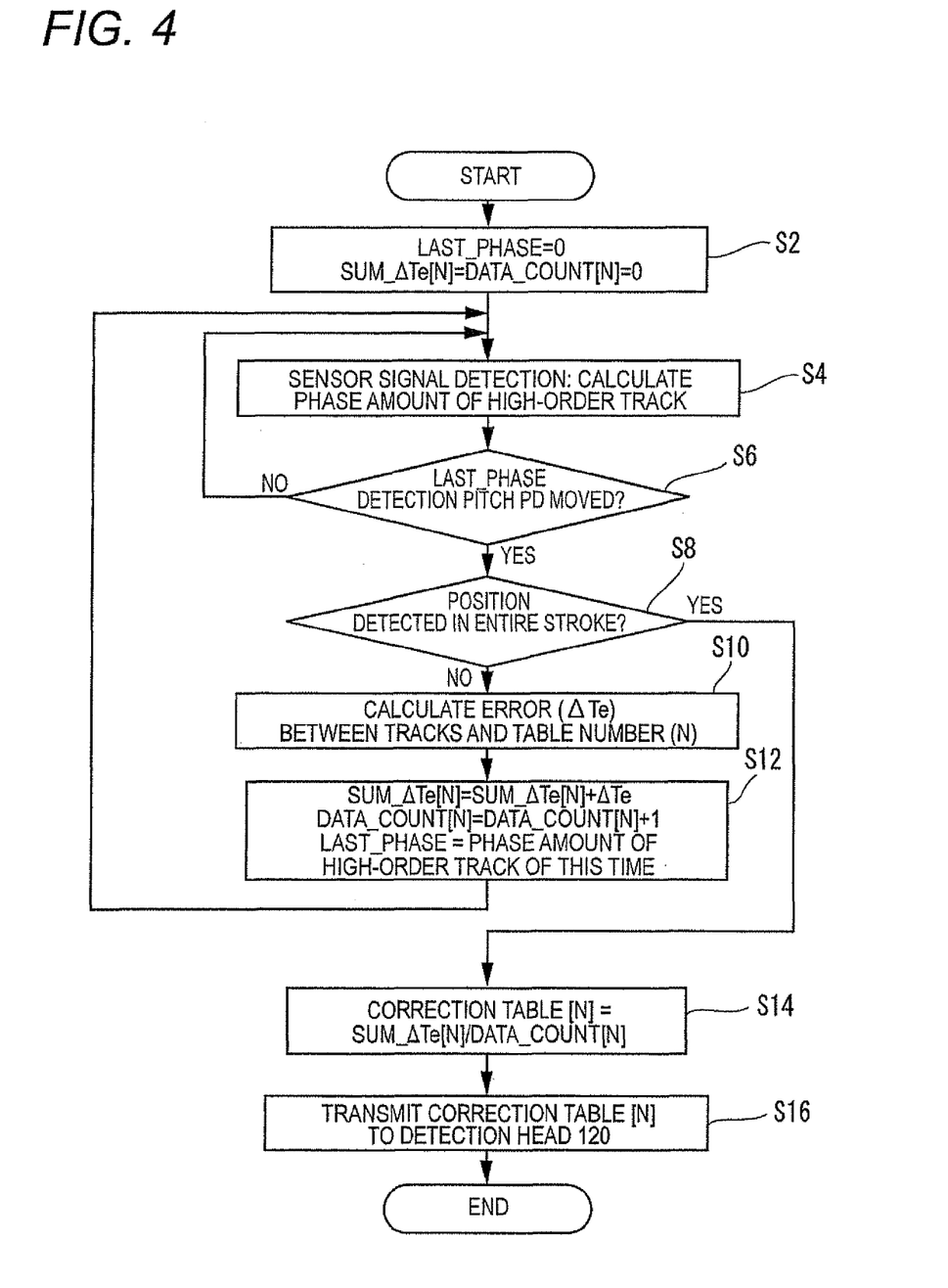
FIG. 4 is a chart showing a flow to obtain correction values from an error between tracks of the absolute type linear encoder according to Embodiment 1 of the present invention.
Figure 5:
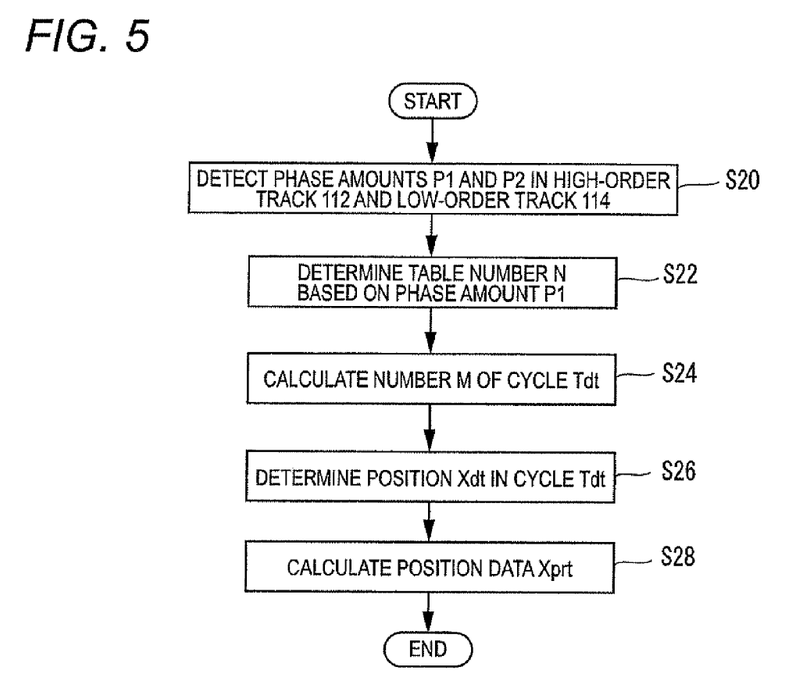
FIG. 5 is a chart showing a flow of position data calculation using the same correction values.

A description is given of Embodiment 1 according to the present invention using FIG. 1 through FIGS. 8A and 8B. FIG. 1 is a general perspective view of an absolute type linear encoder according to the present embodiment. FIGS. 2A and 2B are schematic views of the scale and the detection head thereof, FIG. 3 is a schematic block diagram of the detection head thereof, FIG. 4 is a chart showing a flow to obtain correction values from an error between tracks thereof, FIG. 5 is a chart showing a flow of position data calculation using the same correction values, FIGS. 6A and 6B are views showing the phase amount of the high-order track and the low-order track thereof, and FIGS. 7A and 7B and FIGS. 8A and 8B are views showing a substantial effect based on the correction values.

First, a description is given of configuration of the present embodiment using FIG. 1 through FIG. 3.

The absolute type linear encoder 100 is an encoder that includes a scale 110 having two tracks (high-order track 112 and low-order track 114) and a detection head 120 for detecting the relative position with respect to the scale 110, and that is able to adjust the relative posture between the scale 110 and the detection head 120 when attaching the scale 110 and the detection head 120 to machine equipment which becomes an application object.

As shown in FIG. 1 and FIGS. 2A and 2B, the scale 110 has a high-order track 112 and a low-order track 114. The high-order track 112 and the low-order track 114 are provided in the moving direction X of the detection head 120 in parallel to each other. In the high-order track 112, a coil is laid down so that the output from the detection head 120 changes at one cycle Tut for the entire length of the scale 110. In the low-order track 114, a coil is laid down so that the output from the detection head 120 changes at a plurality of cycles Tdt (in the present embodiment, 4 cycles) for the entire length of the scale 110. In addition, the number of times (cyclic ratio of the low-order track 114 to the high-order track 112) of the cycle Tdt at which the output based on the low-order track 114 changes with respect to the change of one cycle Tut of the output based on the high-order track 112 is called a track ratio TR.

As shown in FIG. 1, the detection head 120 is disposed opposite to the scale 110 in proximity to the scale 110 in a non-contacted state. The detection head 120 is provided with an A/D circuit 125, a processing circuit 126, a memory circuit 128, and a peripheral communication circuit 130 in addition to sensors 112 and 124 as shown in FIG. 3.

The sensors 122 and 124 are provided so as to correspond to the high-order track 112 and the low-order track 114 of the scale 110, respectively. And, the sensors 122 and 124 output phase amounts differing in conjunction with positions in the moving direction X of the high-order track 112 and the low-order track 114.

The A/D circuit 125 converts analog phase amounts, which are output from the sensors 122 and 124, to digital phase amounts.

The processing circuit 126 processes the output from the A/D circuit 125 and can calculate positions, etc., (Number M of cycle Tdt, Position data, etc.) in conjunction with the procedure described later, which is shown in FIG. 5, based on the phase amounts (which may be called an output value of the high-order track 112 and an output value of the low-order track 114) normalized with the maximum value regarded as 1. Also, the processing circuit 126 may call a correction value Cd used when obtaining the position data and number M stored in the memory circuit 128.

The memory circuit 128 is connected to the processing circuit 126 and may store various types of values in conjunction with instructions of the processing circuit 126, and also may store position data and correction values Cd, etc., which are obtained by the processing circuit 126. Further, the correction values Cd are stored in the form of correction table.

The peripheral communication circuit 130 is connected to the processing circuit 126 and may cause the correction value Cd, which is obtained in a data processing unit 132 located outside the detection head 120, to be input in the processing circuit 126. Further, a personal computer, etc., may be used as the data processing unit 132.

Since the absolute type linear encoder 100 is a separate type, there are several advantages, for example, the degree of freedom of attaching the encoder 100 to machine equipment such as a machine tool is large, there is no detection error due to a mechanical structure to retain the relative positional relationship, downsizing of the machine equipment can be achieved, and the design is not spoiled. Further, since the scale 110 and the detection head 120 are not in contact with each other, the movable part of the machine equipment to which the detection head 120 is attached is able to move at a high speed. Still further, the absolute type linear encoder 100 is an electromagnetic induction type having a coil, a rough absolute position is obtained in the entire scale 110 by the high-order track 112, and a position having high resolution power is obtained by the low-order track 114. Therefore, by combining the output from the high-order track 112 with the output from the low-order track 114, the absolute position can be obtained at high resolution power. Also, where a linear motor is combined to the absolute type linear encoder 100, it is possible to determine the position of the magnetic pole of the linear motor without separately providing any special element (Hall device) to determine the position of the magnetic pole of the linear motor. That is, machine equipment to which a linear motor and an absolute type linear encoder are attached can be prevented from becoming complicated, wherein it is possible to prevent the cost from being increased.

Next, a description is given of a method for obtaining a correction value Cd of the absolute type linear encoder 100 according to the present embodiment.

The absolute type linear encoder 100 is attached to machine equipment. At this time, the relative postures of the scale 110 and the detection head 120 are adjusted. And, the detection head 120 and the data processing unit 132 are connected to each other. After that, the processing circuit 126 is controlled via the peripheral communication circuit 130 based on programs of the data processing unit 132. The output values of the high-order track 112 and the low-order track 114, which are detected by the sensors 122 and 124, are continuously transmitted to the data processing unit 132 while moving the detection head 120 over the entire stroke from end to end in the effective range in the moving direction X of the scale 110. When detecting the positions while relatively moving the scale 110 and the detection head 120, the detection pitch Pd is made into almost a fixed spacing by acquiring the output values of the high-order track 112 and the low-order track 114 when a fixed amount of change in phase is confirmed after checking the output value of the high-order track 112. That is, the detection pitch PD is determined based on the output value of the high-order track 112 as a reference. A detailed description is given below using FIG. 4.

First, in the data processing unit 132, respective values of the phase amount (Last_Phase) of the high-order track 112, auxiliary register (SUM_$\Delta$Te[N]) for an error ($\Delta$Te) between tracks in the correction pitch, which is totalized at the detection pitch Pd, and a detection number counter (Data_Count [N]) in the correction pitch Pc detected at the detection pitch Pd are set to zero (Step S2).

Next, the detection head 120 is moved relative to the scale 110, and the output values of the sensor 122 and 124 are calculated as digital phase amounts (Output value of the high-order track 112 and output value of the low-order track 114) P101 and P201 in the processing circuit 126 via the A/D circuit 125 (Step S4). And, the phase amounts P101 and P201 are input in the data processing unit 132 via the peripheral communication circuit 130.

Next, the data processing unit 132 determines whether or not the obtained phase amount P101 of the high-order track 112 becomes the phase amount P11 detected when the detection head 120 moved at the detection pitch Pd for position correction (Step S6).

Where the above-described phase amounts are not coincident with each other (P101≠P11), the detection head 120 is moved, and it is determined again whether the phase amounts are coincident with each other, by obtaining the output value from the sensor 122 (In the case of NO in Step S6).

Where the above-described phase amounts are coincident with each other (P101=P11), with respect to the detection head 120, it is determined whether or not the position thereof is detected for the entire stroke in the moving direction X of the scale 110 (Step S8).

Unless the position is detected for the entire stroke, the data processing unit 132 calculates the error $\Delta$Te between tracks and the table number N to designate the correction value Cd per correction pitch Pc based on the phase amounts P101 and P201 (Step S10). Also, the correction pitch PC is wider than the detection pitch Pd and has at least one or more measurement points for position detection between the correction pitches Pc. The correction pitch Pc is obtained using the output value of the high-order track 112 as a reference.

The error $\Delta$Te between tracks is an error resulting from a difference between the positional relationship of the high-order track 112 to the sensor 122 of the detection head 120 and the positional relationship of the low-order track 114 for the sensor 124 of the detection head 120 (that is, an error produced due to a difference between the positional relationship of the high-order track 112 to the detection head 120 and the positional relationship of the low-order track 114 to the detection head 124. In further detail, the error $\Delta$Te between tracks is expressed by a value (Equation (1)) obtained by subtracting a value, which is obtained by rounding off a differential value obtained by subtracting the output value P201 of the low-order track 114 from a value obtained by multiplying the cyclic ratio (track ratio TR) of the low-order track 114 to the high-order track 112 by the output value P101 of the high-order track 112, from a value obtained by rounding off the differential value and being made into an integral number as the phase amounts P101 and P201 normalized when 1 is assumed to be the maximum value for both of the output value of the high-order track 112 and the output value of the low-order track 114. Also, the track ratio TR is stored in the memory circuit 128 in advance, and is read into the processing circuit 126. Also, the table number N is defined by dividing the output value P101 of the high-order track 112, which changes over the entire length of the scale 110, into 16 sections (Equation (2)). In addition, it is not necessary that the table number N is of 16 sections, and may be appropriately determined.

$$\Delta Te=(P101\times TR-P201)-\text{Round}(P101\times TR-P201) \qquad (1)$$

$$N=IN(P101\times 16)$$

Here, Round is a rounding-off process, and INT is a process of omitting decimals. From (1), the error $\Delta$Te between tracks becomes a value between −0.5 and 0.5.

Next, in the data processing unit 132, the phase amount (Last_Phase) is added to the phase amount P101 of the high-order track 122, and the error $\Delta$Te between tracks (of this time) is added to the auxiliary register (SUM_$\Delta$Te[N]), and further, the detection number counter (Data_Count[N]) is increased by 1, wherein the respective values are updated (changed) (Step S12). After being updated, the above processing is repeated for the entire stroke from end to end of the effective range in the moving direction X of the scale 110 while moving the detection.

Where the position detection is finished for the entire stroke (in the case of Y in Step S8), the correction value Cd per correction pitch P is obtained. That is, the correction value Cd is obtained per table number N corresponding to the correction pitch P, and the correction table is prepared (Step S14). The correction value Cd is expressed by a value obtained averaging the error ΔTe between tracks, which is obtained by the detection pitch Pd, in the correction pitch Pc, as shown in Equation (3).

$$\text{Correction table }[N]=\text{SUM\_}\Delta Te[N]/\text{Data\_Count}[N] \quad (3)$$

Next, the correction table thus obtained is transmitted to the detection head 120 (Step S16) and is stored in the memory circuit 128 via the peripheral communication circuit 130 and the processing circuit 126.

Figure 6A:
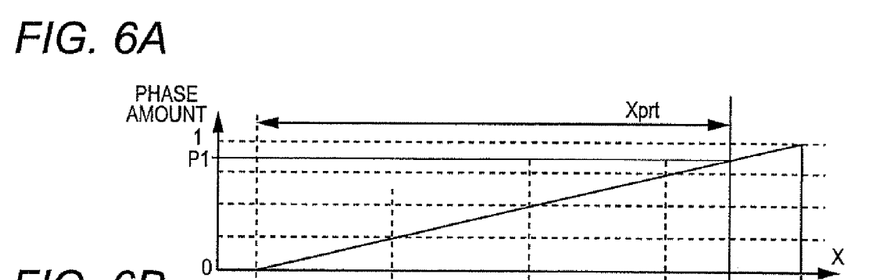
FIGS. 6A and 6B are views showing the phase amount of the high-order track and the low-order track of the absolute type linear encoder according to Embodiment 1 of the present invention.
Figure 6B:
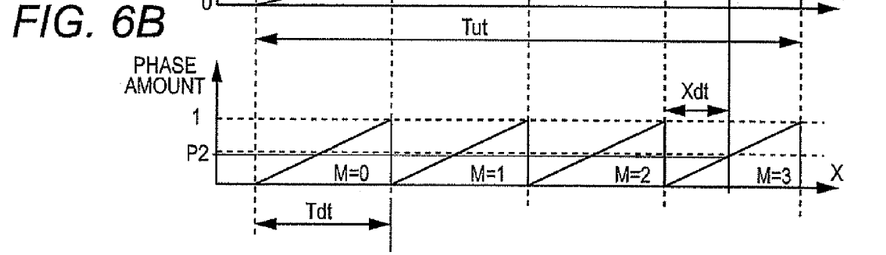

Next, a description is given of operations for obtaining position data using the correction value Cd in the absolute type linear encoder 100 when operating the machine equipment, with reference to FIG. 5 and FIGS. 6A and 6B. In addition, in this stage, it is possible that the data processing unit 132 is removed from the detection head 120.

First, the sensor 122 detects the phase amount P1 based on the positional relationship with the high-order track 112, and the sensor 124 detects the phase amount 22 based on the positional relationship with the low-order track 114 (Step S20).

Next, using equation (2), the table number N is obtained using the output value (Phase amount P1) of the obtained high-order track 112 as a reference (Step S22). And, the corresponding correction value Cd is called into the processing unit 126 with reference to the correction table stored in the memory circuit 128 based on the table number N.

Next, the number M of cycle Tdt of the low-order track 114 is calculated by using the called correction value Cd in the processing circuit 126 (Step S24). This may be obtained by using the phase amounts P1, 22, the track ratio TR and the correction Cd. In detail, as the phase amounts P101 and P201 normalized when 1 is assumed to be the maximum value for both of the output value of the high-order track 112 and the output value of the low-order track 114, the number M of the cycle Td of the low-order track 114 is obtained as a value obtained by rounding off a value, which is obtained by subtracting the output value P2 of the low-order track 114 and the correction Cd from a value obtained by multiplying the track ratio TR by the output value P1 of the high-order track 112, and being made into an integral number (Equation (4)).

$$M=\text{Round}(P\times TR-P2-Cd) \quad (4)$$

The number M thus obtained is stored in the memory circuit 128.

Next, the cycle Tdt is read from the memory circuit 128, and the position Xdt in the cycle Tdt of the low-order track 114 is determined by the processing circuit 126 (Step S26), The position Xdt may be obtained by equation (5).

$$Xdt=Tdt\times P2 \quad (5)$$

And, the position data Xprt in the moving direction X is calculated in the processing circuit 126 (Step S28). The position data Xprt may be obtained by the following equation (6).

$$Xprt=Tdt\times M+Xdt \quad (6)$$

The obtained position data Xprt is output to a peripheral device via the peripheral communication circuit 130.

A detailed example of the calculation is shown below.

For example, the position data is obtained with respect to a case where it is assumed that, for example, the phase amount P1 is 0.87, the phase position P2 is 0.43, the correction Cd is 0.05, the track ratio TR is 4, and the cycle Tdt is 1 mm. At this time, the number M may be obtained by equation (7).

$$M=\text{Round}(0.87\times 4-0.43-0.05)=3 \quad (7)$$

Therefore, the position data Xprt for the position of the detection head 120 to the scale 110 is obtained by equation (8) based on the number M of the cycle Tdt and the output value P2 of the low-order track 114.

$$Xprt=1\times 3+1\times 0.43=3.43(\text{mm}) \quad (8)$$

Thus, since a series of acquisitions of the correction values Cd are carried out by the data processing unit 132, it is possible to prevent the development term of the detection head 120 from being lengthened without making control of the detection head 120 complicated. Further, since the data processing unit 132 may be concurrently used along with the other detection heads, the detection head 120 can be made compact, and the production cost thereof may be reduced.

Figure 7A:
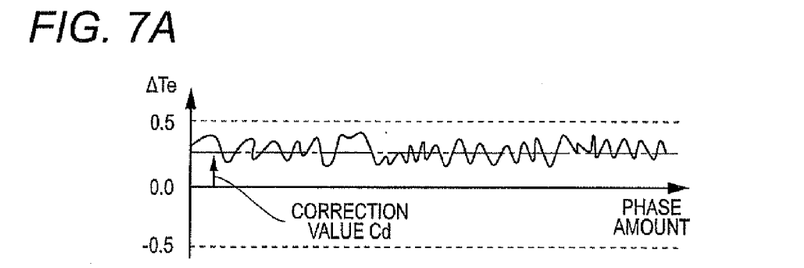
FIGS. 7A and 7B are views showing a substantial effect based on the correction values of the absolute type linear encoder according to Embodiment 1 of the present invention.
Figure 7B:
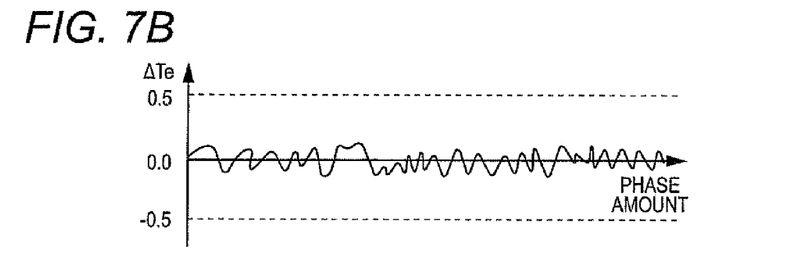

Also, where the error ΔTe between tracks is shown in a fixed narrow range (0 through 5) over the entire length of the scale 110 as shown in FIG. 7A, it is understood that the error ΔTe between tracks shows an initially relative position error (fixed and not fluctuated) between the scale 110 and the detection head 120. In this case, the average value of errors ΔTe between tracks is taken as a single correction pitch Pc over the entire length of the scale 110, and the average value may be set as the correction value Cd. In this case, the error ΔTe between tracks in operating machine equipment is determined to be a value substantially close to zero, and as shown in FIG. 7B, the tolerance of the error ΔTe between tracks in operating the machine equipment can be widened.

Figure 8A:
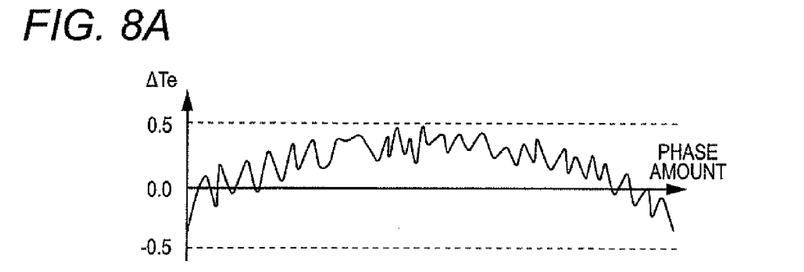
FIGS. 8A and 8B is a view showing a substantial effect based on the correction values of the absolute type linear encoder according to Embodiment 1 of the present invention.
Figure 8B:
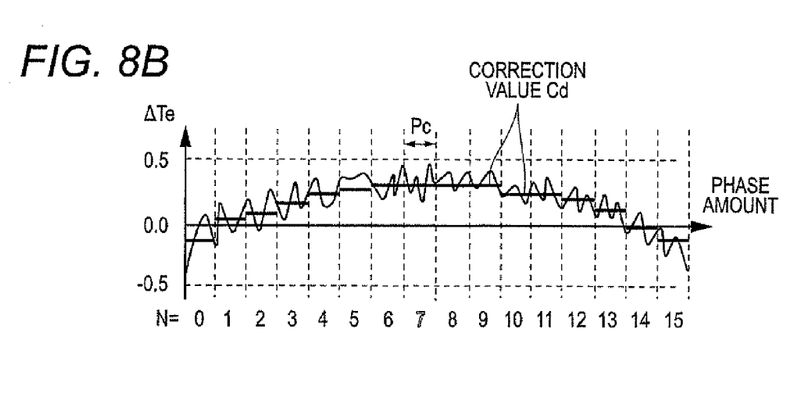

Also, where the error ΔTe between tracks has a so-called large undulation over the entire length of the scale 110 as shown in FIG. 8A, an appropriate correction pitch Pc is determined for the right balance with the cycle of the undulation to divide the entire length of the scale 110, and the table number N is assigned. And, an average value is taken for the errors ΔTe between tracks in the respective correction pitches Pc, the average value is determined to be the correction value Cd (FIG. 8B), so that it is possible to make the errors ΔTe between tracks a value close to zero for the respective correction pitches Pc.

In any case, it is possible that the error ΔTe between tracks can be made to be a value close to zero by the above-described correction values Cd. For this reason, since the tolerance of the error ΔTe between tracks can be enlarged to the maximum limit (−0.5 through 0.5) for each of the correction pitches Pc, it is possible to minimize generation of coordinate skipping resulting from fluctuations in the number M of the cycle Tdt of the low-order track 114 due to curvature of the scale 110, rough machining accuracy of the attaching surface of the scale 110 and a change in position of the detection head 120 to the scale 110.

Also, since the detection pitch Pd and the correction pitch Pc are determined by using the output value of the high-order track 112, which is continuously output in the moving direction X of the scale 110, as a reference, coordinate skipping can be further reduced, where higher accurate position detection can be brought about.

Also, in the present embodiment, both the output value of the high-order track 112 and the output value of the low-order track 114 are made into phase amounts P1 and P2 normalized when it is assumed that 1 is regarded as the maximum value, and the number M of the cycle Tdt of the low-order track 114 is determined to be an integral number shown by equation (4). That is, since the correction Cd influences only the number M and does not influence the position detection by the low-order track 114 having high resolution power, position detection of high resolution power can be achieved.

Also, since the absolute type linear encoder 100 according to the present embodiment is provided with the memory circuit 128 in which the correction value Cd is stored, position adjustment of the detection head 120 can be appropriately carried out with the data processing unit 132 not connected thereto if the correction value Cd is once stored and it is not necessary to update the same.

Further, since the present embodiment includes the peripheral communication circuit 130 that inputs the correction value Cd obtained outside the absolute type linear encoder 100 into the processing circuit 126, it is not necessary to provide the means for obtaining the correction value Cd in the encoder, so that it becomes possible to take in the correction value Cd only as necessary.

Therefore, according to the present invention, the tolerance of mechanical position adjustment with respect to the scale 110 and the detection head 120 can be increased while enabling highly accurate position detection. That is, the scale 110 of the absolute type linear encoder and the detection head 120 thereof must be attached to machine equipment at a positional relationship greatly different from the initial positional relationship (for example, the accuracy when shipping from a factory), mechanical re-adjustment becomes unnecessary, the position adjustment may be carried out by using the correction value, so that highly accurate position detection is enabled. That is, it is possible to reduce the number of steps of adjustment of the positional relationship between the scale 110 and the detection head 120. In addition, since the machining accuracy of the surface of machine equipment on which the scale 110 and the detection head 120 are attached can be relaxed, attaching thereof can be achieved at a low cost. Further, since there will be no case where an erroneous absolute position is detected, it is possible to improve the reliability in position detection.

Next, a description is given of Embodiment 2. The present embodiment is the same as the configuration of the absolute type linear encoder according to Embodiment 1. However, the method for obtaining the correction value Cd differs. The correction value Cd according to Embodiment 1 is obtained by averaging the error ΔTe between tracks, which has been obtained in the tolerance (−0.5 through 0.5) of the error ΔTe between tracks, in the correction pitch Pc as it is. On the other hand, the correction value Cd according to the present embodiment is obtained by adding an offset to the error ΔTe between tracks, which has been obtained in the tolerance (−0.5 through 0.5) of the error ΔTe between tracks, and is obtained with the range of tolerance of the error ΔTe between tracks substantially enlarged to −0.75 through 0.75.

Describing in further detail, two threshold values (0.25, −0.25) and three offset values (1, 0, −1) are prepared with respect to the error ΔTe between tracks. When the error ΔTe between tracks exceeds the threshold value (0.25 or −0.25), the offset value (1, 0, or 1) is changed in conjunction with the magnitude of the error ΔTe between tracks, which is obtained when the last position detection was performed at the detection pitch Pd for position correction in the correction pitch Pc, and the changed offset value (1, 0 or 1) is added to the error ΔTe between tracks, wherein the error ΔTe between tracks is varied. Also, two flags FF and SF are established, the magnitude of the error ΔTe between tracks obtained in the last position detection is determined.

Here, the offset value subject to the magnitude of the error ΔTe between tracks, which is obtained in the last position detection, will be changed as described below. Where the error ΔTe between tracks obtained in the last position detection exceeds the downside threshold value (−0.25) with respect to the error ΔTe between tracks, which exceeds the upside threshold value (0.25), the offset value is changed to −1. On the contrary, where the error ΔTe between tracks obtained in the last position detection exceeds the upside threshold value (0.25) with respect to the error ΔTe between tracks which exceeds the downsize threshold value (−0.25), the offset value is changed to 1. In the other combinations, no offset is added (that is, the offset value remains unchanged (0)).

Hereinafter, a description is given of a method for obtaining the correction value Cd using FIG. 9 through FIG. 11. The others are omitted.

First, in the data processing unit 132, the respective values of the first flag FF, the second flag SF, the phase amount P1 (Last_Phase), the auxiliary register (SUM_ΔTe[N]) of the error ΔTe between tracks, and the detection number counter (Data_Count[N]) are set to zero (0) (Step S50).

Next, the detection head 120 is moved relative to the scale 110, and the output values of the sensors 122 and 124 calculated as the digital phase amounts P102 and P202 in the processing circuit 126 via the A/D circuit 125 (Step S52). And, the phase amounts P102 and P202 are input in the data processing unit 132 via the peripheral communication circuit 130.

Next, it is determined by the data processing unit 132 whether the obtained phase amount P102 of the high-order track 112 becomes the phase amount P12 the position of which is detected when the detection head is moved at the detection pitch Pd for position detection thereof (Step S54).

Where the above-described phase amounts are not coincident with each other (P102≠P12), the detection head 120 is moved, and an output value is again obtained from the sensor 122 for determination (in the case of NO in Step S54).

Where the above-described phase amounts are coincident with each other (P102=P12), it is determined whether or not the position of the detection head 120 has been detected for the entire stroke from end to end of the effective range in the moving direction X of the scale 110 (Step S56).

Unless the position detection has been performed for the entire stroke, the error ΔTe between tracks and the table number N to designate the correction value Cd per correction pitch Pc are calculated by the data processing unit 132 based on the phase amounts P102 and P202 (Step S58). The error ΔTe between tracks and the table number N may be obtained by using equations (1) and (2), respectively.

Next, where the obtained error ΔTe between tracks is 0.25 or less and −0.25 or more (in the case of NO in Step S60 and NO in step S62), the error ΔTe between tracks is updated as an error NewΔTe between tracks as it is (Step S64).

Where the error ΔTe between tracks is smaller than −0.25 (in the case of NO in Step S60 and YES in Step S62), the error ΔTe between tracks is updated as a new error NewΔTe between tracks as it is (Step S68) unless the first flag FF obtained last time is 1 (NO in Step S66).

Where the error ΔTe between tracks is smaller than −0.25 (in the case of NO in Step S60 and YES in Step S62), 1 is added to the error ΔTe between tracks as an offset value (the offset value is changed from zero) when the first flag FF obtained last time is 1 (YES in Step S66), and the error ΔTe between tracks is updated as a new error NewΔTe between tracks (Step S70).

Where the error ΔTe between tracks is larger than 0.25 (Yes in Step S60), the error ΔTe between tracks is updated as a new error NewΔTe between tracks as it is (Step S74) unless the second flag SF obtained last time is 1 (NO in Step S72).

Where the error ΔTe between tracks is larger than 0.25 (YES in Step S60), −1 is added to the error ΔTe between tracks as an offset value (the offset value is changed from zero) when the second flag SF obtained last time is 1 (YES in Step S72), and the error ΔTe between tracks is updated as a new error NewΔTe between tracks (Step S76).

Next, in the data processing unit 132, the phase amount Last_Phase) is added to the phase amount P102 of the high-order track 112 (of this time), and the new error NewΔTe between tracks is added to the auxiliary register (SUMΔTe [N]). Further, the detection number counter (Data_Count[N]) is increased only by 1, and the respective values are updated (changed), respectively (Step S78).

Next, if new error NewΔTe between tracks is 0.25 or less and −0.25 or more (in the case of NO in Step S80 and NO in Step S82), both the first flag FF and the second flag SF are made into zero (Step S84).

Where the new error NewΔTe between tracks is smaller than −0.25 (in the case of NO in Step S80 and YES in Step S82), the first flag FF is made into zero, and the second flag SF is made into 1 (Step S86).

Where the new error NewΔTe between tracks is larger than 0.25 (YES in Step S80), the first flag FE is made into 1, and the second flag is made into zero (Step S88).

Next, the above procedure is repeated until the position detection is finished for the entire stroke in the moving direction X of the scale 110 (Yes in Step S56), by moving the detection head 120.

Where the position detection is finished for the entire stroke (in the case of YES in Step S56), the correction value Cd per correction pitch PC is obtained. That is, the correction value Cd per table number N corresponding to the correction pitch Pc, and a correction table is prepared (Step S90). The correction value Cd may be obtained by using equation (3).

Next, the obtained correction table is transmitted to the detection head 120 (Step S92), and is stored in the memory circuit 128 via the peripheral communication circuit 130 and the processing circuit 126.

Next, a description is given of a case where the present embodiment is particularly effectively applied to.

Figure 10:
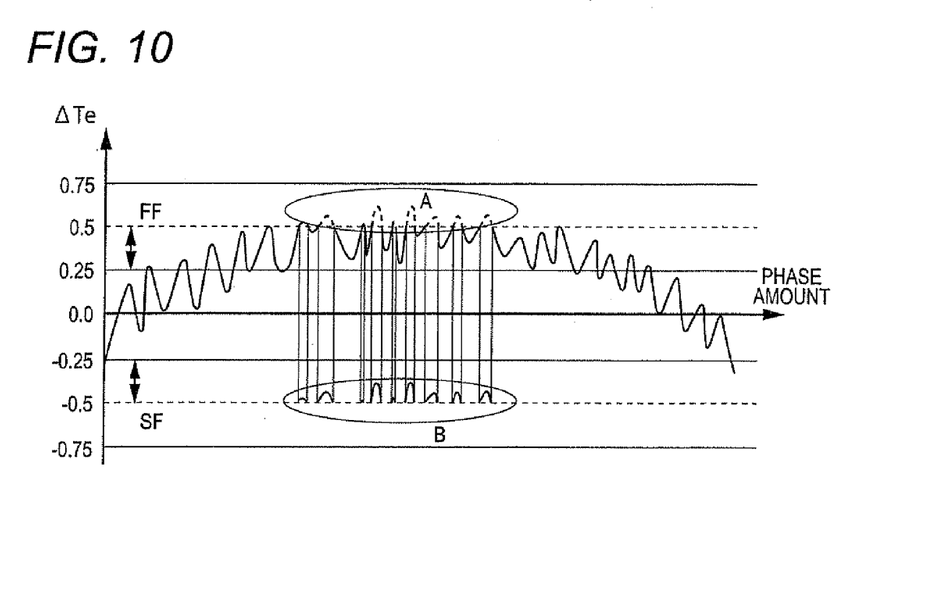
FIG. 10 is a view showing the position to which the first flag and the second flag are applied and the error between tracks of the absolute type linear encoder according to Embodiment 2 of the present invention.

As shown in FIG. 10, for example, where the mechanical position adjustment between the scale 110 and the detection head 120 is not sufficiently performed, and the straightness between the scale 110 and the detection head 120 is wrong, the error ΔTe between tracks will exceed 0.5, wherein the error ΔTe between tracks shown in area A, which originally is to be acquired, will be obtained as a value of area B. This is because −1 is added to a value exceeding 0.5 in the error ΔTe between tracks. If the absolute position is obtained at the position with the present embodiment not applied, the number M for which the cycle Tdt of the low-order track 114 slipped is obtained, so that coordinate skipping of the detection position will result therefrom.

However, it is possible to eliminate a phenomenon of coordinate skipping by obtaining the correction Cd by the above-described method. That is, the above-described threshold value and offset value are provided, and further the first flag FF is set to 1 when the value of the error ΔTe between tracks is larger than 0.25 and is set to zero in other cases. Simultaneously, the second flag SF is set to 1 when the value of the error ΔTe between tracks is smaller than −0.25 and is set to zero in other cases. By obtaining the correction value Cd using the above, it becomes possible to obtain the correction Cd at the error ΔTe between tracks shown in area A, which originally is to be obtained, even in the case where the error ΔTe between tracks exceeds 0.5 in the area A shown in FIG. 10.

Figure 11:
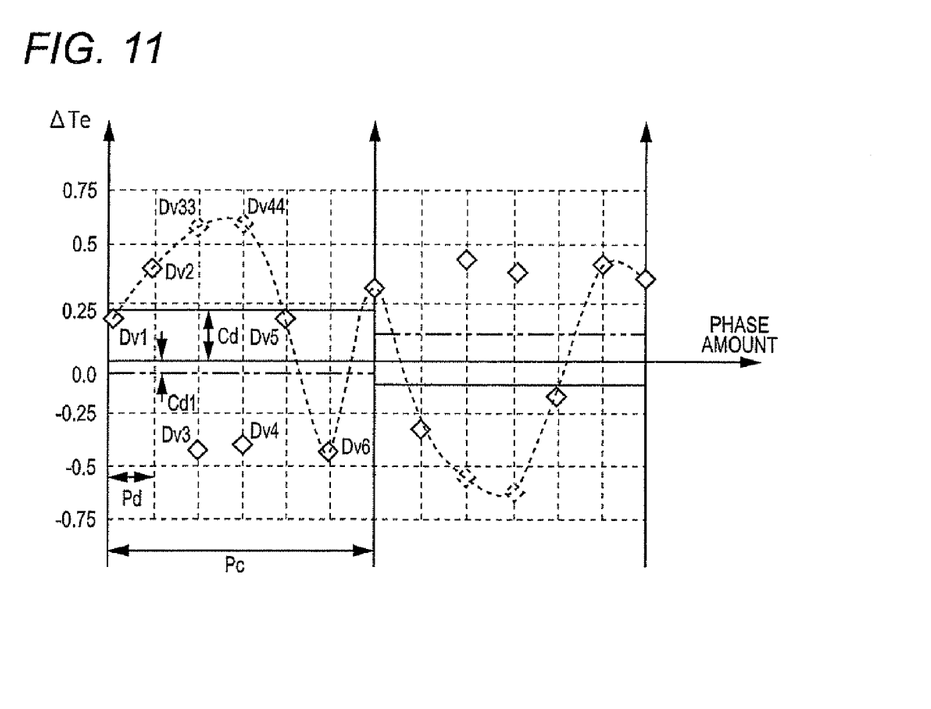
FIG. 11 is a view showing a detailed error between tracks of the absolute type linear encoder according to Embodiment 2 of the present invention.

A further detailed description is given using FIG. 11. FIG. 11 describes a correction pitch Pc divided based on the output value (phase amount) of the high-order track 112 on the abscissa thereof, and the correction pitch Pc is divided into a plurality in terms of the detection pitch Pd (six detection pitches in the present embodiment). Here, a case is taken into consideration where although data of the error ΔTe between tracks, which originally is to be obtained, is Dv1, Dv2, Dv33, Dv44, Dv5 and Dv5 if based on the relationship between the scale 110 and the detection 120, the data of the error ΔTe between tracks, which has been obtained by actual signal detection of the sensors 122 and 124, becomes Dv1 through Dv6. Hereinafter, a description is given of the respective data.

Figure 9:
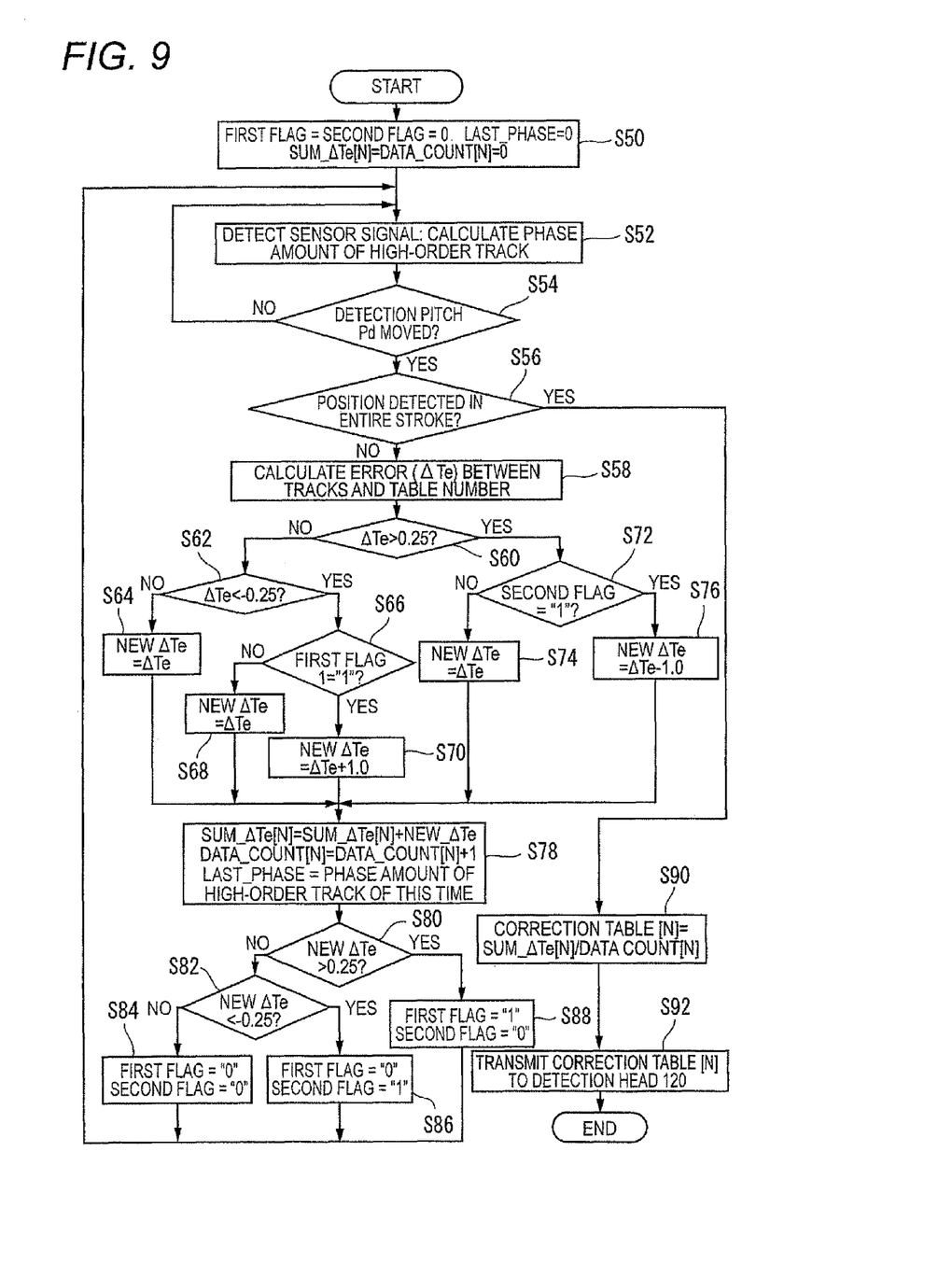
FIG. 9 is a chart showing a flow to obtain correction values based on an error between tracks of an absolute type linear encoder according to Embodiment 2 of the present invention.

In conjunction with FIG. 9, since data Dv1 is a value between 0 and 0.25, both the first flag FF and the second flag SF are zero (The offset value is zero, and data Dv1 passes through S64 and S84).

Since data Dv2 being the next measurement point of the detection pitch Pd is a value between 0.25 and 0.5, the first flag FF is 1, and the second flag is zero (The offset value is zero, and Dv2 passes through Step S74 and Step S88).

Since data Dv3 being the next measurement point is a value between −0.25 and −0.5, here, the first flag FF of the data Dv2 of the last time is 1, an offset value of 1 is added to data Dv3 (that is, the offset value is changed to 1), wherein with respect to data Dv3, a new error NewΔTe between tracks will be calculated substantially as data DV33 between 0.5 and 0.75. Therefore, in regard to data Dv3, substantially, the first flag FF becomes 1, and the second flag SF becomes zero (Dv33 passes through Step S70 and Step S88).

Data Dv4 being the next measurement point is a value between −0.25 and −0.5 as in data Dv3. Here, since the first flag FF is 1 in data Dv3 of the last time, an offset value of 1 is added to data Dv4 (the offset value is changed to 1), wherein with respect to data Dv4, a new error NewΔTe between tracks will be calculated substantially as data DV44 between 0.5 and 0.75. Therefore, in regard to data Dv4, substantially, the first flag FF becomes 1, and the second flag SF becomes zero (Dv44 passes through Step S70 and Step S88).

Since data Dv5 being the next measurement point is a value between 0 and 0.25, both of the first flag FF and the second flag SF become zero (the offset value is zero, and data Dv5 passes through Step S64 and Step S84).

Data Dv6 being the next measurement point is a value between −0.25 and −0.5. Here, since the first flag FF of data Dv5 of the last time is zero, any offset value is not added to data Dv6 (the offset value is zero), and becomes a new error NewΔTe between tracks as it is. Therefore, in data Dv6, the first flag FF becomes zero, and the second flag SF becomes 1 (Data Dv6 passes through Step S68 and Step S86).

Thus, in the present embodiment, a threshold value and an offset value are provided with respect to the error ΔTe between tracks. When the error ΔTe between tracks exceeds the threshold value, the offset value is changed in conjunction with the magnitude of the error ΔTe between tracks, which has been obtained when detecting the position at the detection pitch Pd in the correction pitch Pc last time, and the changed offset value is added to the error ΔTe between tracks, thereby changing the error ΔTe between tracks. Therefore, the correction value Cd can be obtained by using a substantially original error ΔTe between tracks, which the error ΔTe between tracks is a value exceeding the tolerance (−0.5 through 0.5).

Also, since the magnitude of the error ΔTe between tracks, which has been obtained in the last time position detection, is determined by the first flag FF and the second flag SF, it is not necessary to store the error ΔTe between tracks of the last time as word data, so that the memory capacity can be reduced, and a low cost can be achieved. At the same time, the correction value Cd can be obtained at a high speed because of only slight calculations.

A further detailed description is given of the error ΔTe between tracks. In the present embodiment, a threshold value is provided at 0.25 and −0.25 of the error ΔTe between tracks, and further the first flag FF and the second flag SF are provided in areas exceeding the respective threshold values, respectively. Therefore, the offset value (1, 0 or −1) is changed and added to the error ΔTe between tracks (which is obtained in the position detection of this time) in conjunction with the relationship in magnitude among the first flag FF and the second flag SF, which have been obtained in the last time position detection, the error ΔTe between tracks (which is obtained in the position detection of this time), and the respective threshold values thereof. Accordingly, the detection pitch Pd of the error ΔTe between tracks is made small so that, although the error ΔTe between tracks is obtainable in the range from −0.5 to 0.5, a difference between the error ΔTe between tracks (obtained in the position detection of this time) and the error ΔTe between tracks which has been obtained in the position detection of the last time becomes 0.5 or less, so that the correction value Cd can be obtained with the error ΔTe between tracks enlarged to −0.75 through 0.75 at maximum.

That is, even in a case where the straightness of the detection head 120 relative to the scale 110 is wrong, relative positional deviation between the scale 110 and the detection head 120 greatly changes for the entire length, and the error ΔTe between tracks comes out of the inherent tolerance (−0.5 through 0.5), the correction value Cd can be obtained by using the error ΔTe between tracks, which originally is to be obtained. And, when the correction value Cd is made into an average value of the errors ΔTe between tracks, the correction value becomes a value of the correction value Cd shown in FIG. 11, and the correction value Cd further suited to the error ΔTe between tracks, which originally is to be obtained, can be brought about in comparison with the correction value Cd1 using data Dv3 and Dv4 with the present embodiment not used.

Also, by further shortening the correction pitch Pc in the present embodiment shown in FIG. 11, the correction value Cd of the error ΔTe between tracks can be further faithfully obtained. That is, generation of coordinate skipping resulting from improper straightness can be further reduced by shortening the correction pitch Pc, so that it is possible to obtain highly accurate position data. At this time, the correction value Cd may take a value up to 0.75 (−0.75) at maximum.

The present invention was described based on the above-described embodiments. However, the present invention is not limited to the above-described embodiments. It is a matter of course that the present invention is subject to improvements and design changes within the range not departing from the spirit of the present invention.

For example, in the embodiments described above, both the output value of the high-order track 112 and the output value of the low-order track 114 are obtained as phase amounts normalized with the maximum value regarded as 1. However, the present invention is not limited thereto. For example, the output value of the high-order track and the output value of the low-order track may be obtained as separate values. Also, the error between tracks is a value resulting from a difference between the position of the high-order track to the detection head and the position of the low-order track thereto, and is not limited to equation (1). Further, the correction value is not necessarily the average and may be subject to weighting in response to the deviation. Also, an obtained error between tracks may be used as the correction value as it is.

In addition, in the embodiments described above, although the detection pitch Pd and the correction pitch Pc were obtained based on the output value of the high-order track 112, the present invention is not limited thereto. For example, these pitches may be obtained based on the output of the low-order track.

Further, although both the output value of the high-order track 112 and the output value of the low-order track 114 are obtained as phase amounts normalized with the maximum value regarded as 1, and the number M of the cycle Tdt of the low-order track 114 is a value obtained by equation (4), the present invention is not limited thereto. The present invention may be such that the number of the cycle of the low-order track is obtained by using the output value of the high-order track, the output value of the low-order track, the cyclic ratio of the low-order track to the high-order track, and the correction value.

Figure 12:
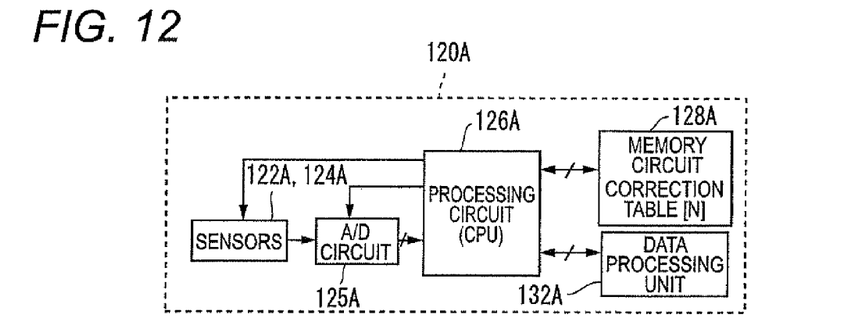
FIG. 12 is a brief block diagram of a detection head according to Embodiment 3 of the present invention.

Still further, the embodiments described above are provided with the peripheral communication circuit 130 for inputting a correction value Cd, which is obtained outside the absolute type linear encoder 100, into the processing circuit 126. However, the present invention is not limited thereto. For example, as in the detection head 120 according to Embodiment 3 shown in FIG. 12, no peripheral communication circuit is provided, the data processing unit 132A for obtaining the correction value Cd may be provided. In this case, it is possible to appropriately obtain the correction value, so that the correction value best suited to individual absolute type linear encoders can be obtained. In addition, the memory circuit 128A is not necessarily used with respect to the correction value Cd.

Figure 13:
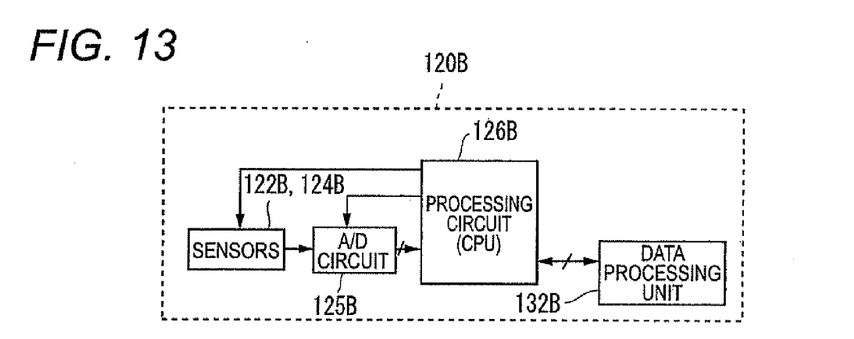
FIG. 13 is a brief block diagram of a detection head according to Embodiment 4 of the present invention.
Figure 14A:
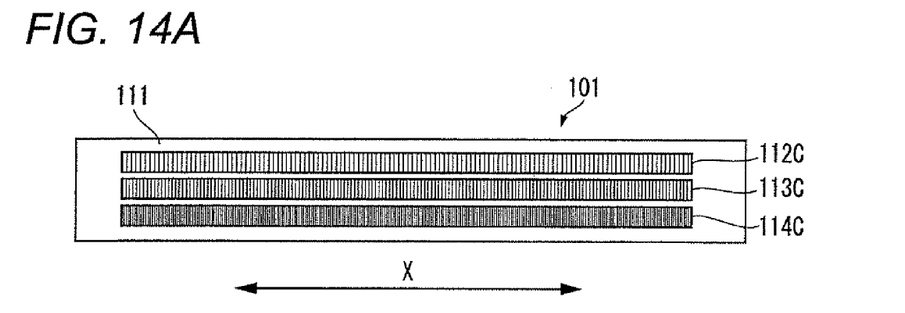
FIGS. 14A and 14B are schematic views showing a scale and a detection head according to Embodiment 5 of the present invention.
Figure 14B:
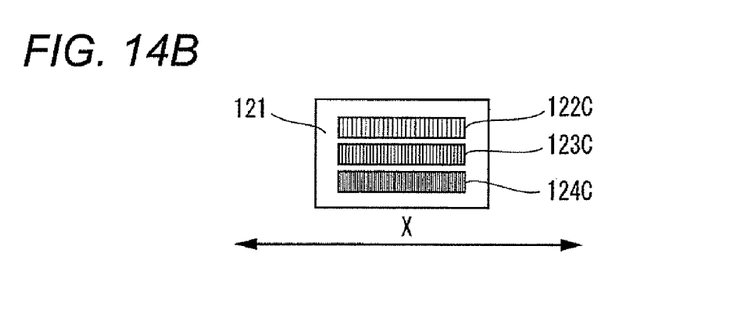
Figure 15A:
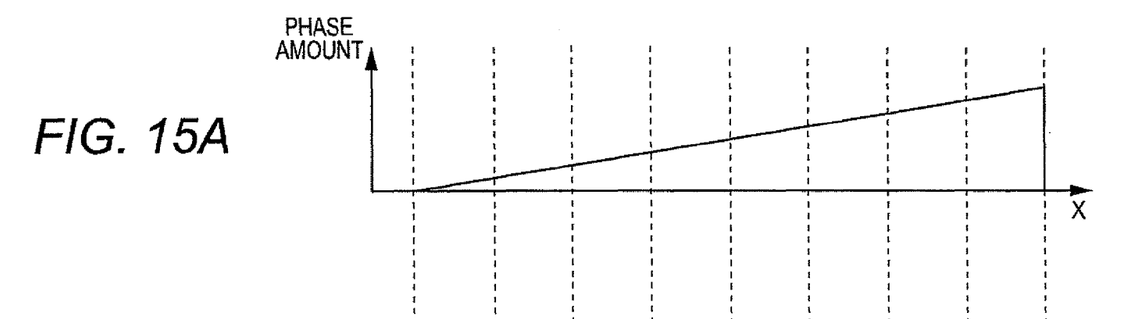
FIGS. 15A to 15C are views showing the phase amount detected by a detection head when scanning a scale having three tracks (high-order track, middle-order track and low-order track), according to Embodiment 5 of the present invention.
Figure 15B:
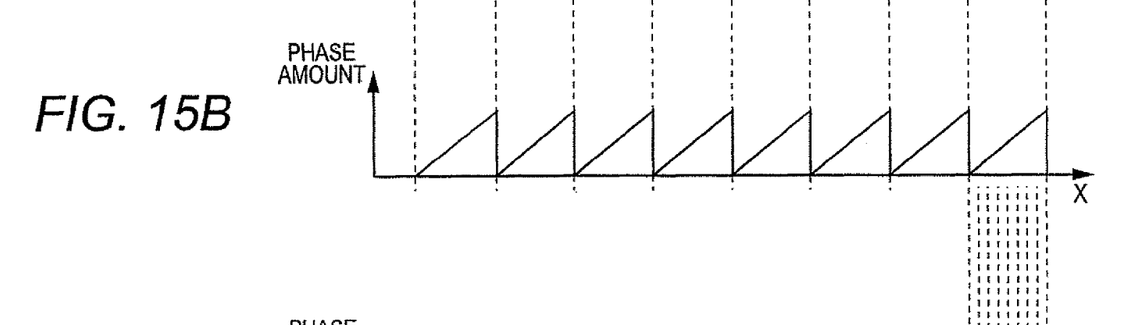
Figure 15C:
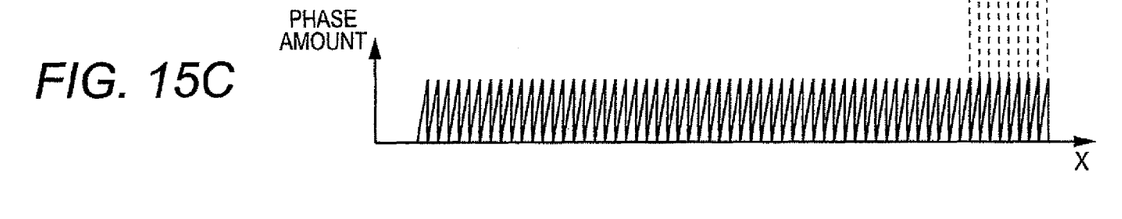

In addition, the embodiments described above are connected to the processing circuit 126, and at the same time are provided with the memory circuit 128 in which the correction value Cd is stored. However, the present invention is not limited thereto. For example, as in a detection head 120B of Embodiment 4 shown in FIG. 13, a data processing unit 132B for obtaining the correction value Cd is provided without using the memory circuit, and it is possible to obtain a correction value for the entire length of the scale or a part thereof whenever operating the machine equipment. In this case, the configuration thereof can be further simplified. In addition, such a configuration may be adopted by which only a correction value is obtained by the processing circuit or the data processing unit from time to time with the error ΔTe between tracks per detection pitch stored. Also, the data processing unit may be provided outside the detection head.

Also, in the embodiments described above, two threshold values (−0.25, 0.25) and three offset values (−1, 0, 1) are prepared with respect to the error ΔTe between tracks, the offset value is changed in conjunction with the magnitude of the error ΔTe between tracks, which has been obtained in the last time position detection at the detection pitch Pd in the correction pitch Pc when the error ΔTe between tracks exceeds the threshold value, and the error ΔTe between tracks is changed by adding the changed offset value to the error ΔTe between tracks. However, the present invention is not limited thereto. That is, the threshold values and the offset values may be provided by a different quantity and a different value. Also, the offset value is not changed only based on a comparison with the error between tracks, which has been obtained in the last time position detection, but the error between tracks of the time before the last time in a correction pitch may be taken into consideration.

Further, although in the embodiments described above the magnitude of the error ΔTe between tracks, which has been obtained in the last time position detection, is determined by two first and second flags FF, SF, the present invention is not limited thereto. One or more multiple-valued flags may be used, or the flag itself may not be used.

Also, although in the embodiments described the scale 110 has the high-order track 112 and the low-order track 114, the present invention is not limited thereto. For example, as in Embodiment 5 shown in FIGS. 14A and 14B and FIGS. 15A to 15C, the absolute type linear encoder 101 may include a scale 111 having a high-order track 112C, a track 113C (called a medium-order track) classified to the low-order track, and a low-order track 114C. In this case, the detection head 121 will have sensors 122C, 123C and 124C corresponding to three tracks. Therefore, since the medium-order track 113C exists between the high-order track 112C and the low-order track 114C even if the track ratio TR therebetween is made large, the range of absolute position detection in the scale 111 can be further enlarged, and at the same time, the position accuracy can be retained at high resolution power.

Also, although the track ratio TR was 4 in the embodiments described above, the present invention is not limited thereto. For example, as in Embodiment 5 shown in FIGS. 15A to 15C, the track ratio between the high-order track 112C and the medium-order track 113C, and the track ratio between the medium-order track 113C and the low-order track 114C may be 8, respectively, or the two track ratios may be made the same as each other. Also, when a plurality of low-order tracks (the medium-order track 113C and the low-order track 114C) exists as in Embodiment 5, the present invention is not necessarily applied to the high-order track 112C, the medium-order track 113C and the low-order track 114C, wherein the present invention may be appropriately applicable to only the high-order track 112C and the medium-order track 113C or only the medium-order track 113C and the low-order track 114C.

In addition, in the embodiments described above, although the absolute type linear encoder uses an electromagnetic induction system, the present invention is not limited thereto. For example, it does not matter that a photoelectric type is used.

Further, although a single detection head is provided in the embodiments described above, the present invention is not limited thereto. For example, it does not matter that a plurality of detection heads are provided with respect to a scale. In this case, since position correction can be carried out with a specified point of the scale made common, it becomes possible to perform highly accurate position detection with respect to all of the plurality of detection heads.

What is claimed is:

1. An absolute type linear encoder comprising:
a scale comprising a plurality of tracks including a high-order track and a low-order track; and
a detection head configured to detect a relative position to the scale, a relative posture of the scale to the detection head being adjusted when attaching the scale and the detection head to machine equipment that becomes an application object, the detection head receiving an output outputted from the low-order track at a plurality of cycles for the entire length of the scale to the high-order track; and
a processing circuit configured to obtain the number of cycles of the low-order track by using a correction value obtained per correction pitch, the width of which is wider than the detection pitch, based on an error between tracks produced by a difference between the position of the high-order track to the detection head and the position of the low-order track thereto when the position of the detection head is detected at a detection pitch for the position correction thereof, an output value of the high-order track, an output value of the low-order track, and a cyclic ratio of the low-order track to the high-order track, and obtain the position of the detection head to the scale based on the number of the cycles and the output value of the low-order track.

2. The absolute type linear encoder according to claim 1, wherein when both the output value of the high-order track and the output value of the low-order track are made into a phase amount normalized with the maximum value regarded as 1, the error between tracks is a value obtained by subtracting a value made into an integral number by rounding off a differential value, which is obtained by subtracting the output value of the low-order track from a value obtained by multiplying the cyclic ratio of the low-order track to the high-order track by the output value of the high-order track, from the differential value, and the correction value is a value obtained by averaging the error between tracks obtained at the detection pitch in the correction pitch.

3. The absolute type linear encoder according to claim 1, wherein
the detection pitch and the correction pitch are obtained by using the output value of the high-order track as a reference.

4. The absolute type linear encoder according to claim 1, wherein
when both the output value of the high-order track and the output value of the low-order track are made into a phase amount normalized with the maximum value regarded as 1, the number of the cycles of the low-order track is obtained in the processing circuit as a value made into an integral number by rounding off a value obtained by subtracting the output value of the low-order track and the correction value from a value obtained by multiplying the cyclic ratio of the low-order track to the high-order track by the output value of the high-order track.

5. The absolute type linear encoder according to claim 1, further comprising
a memory circuit connected to the processing circuit, in which the correction value is stored.

6. The absolute type linear encoder according to claim 1, further comprising
a peripheral communication circuit configured to input the correction value obtained outside into the processing circuit.

7. The absolute type linear encoder according to claim 1, wherein:
a threshold value and an offset value are provided with respect to the error between tracks;
the offset value is changed in conjunction with the magnitude of the error between tracks obtained in the last time position detection at least a detection pitch to correct the position in the correction pitch when the error between tracks exceeds the threshold value; and
the error between tracks is changed by adding the changed offset value to the error between tracks.

8. A method for adjusting the position of an absolute type linear encoder that includes: a scale comprising a plurality of tracks including a high-order track and a low-order track; and a detection head configured to detect a relative position to the scale, a relative posture of the scale to the detection head being adjusted when attaching the scale and the detection head to machine equipment that becomes an application object, the detection head receiving an output outputted from the low-order track at a plurality of cycles for the entire length of the scale to the high-order track, the method comprising:
performing position detection at a detection pitch for position correction of the detection head;
obtaining a correction value per correction pitch, the width of which is wider than the detection pitch, based on an error between tracks produced by a difference between the position of the high-order track to the detection head and the position of the low-order track thereto at this time; and obtaining the number of cycles of the low-order track using the output value of the high-order track, the output value of the low-order track, a cyclic ratio of the low-order track to the high-order track, and the correction value.

9. The method according to claim 8, wherein when both the output value of the high-order track and the output value of the low-order track are made into a phase amount normalized with the maximum value regarded as 1, the error between tracks is obtained as a value obtained by subtracting a value made into an integral number by rounding off a differential value, which is obtained by subtracting the output value of the low-order track from a value obtained by multiplying the cyclic ratio of the low-order track to the high-order track by the output value of the high-order track, from the differential value, and the correction value is obtained as a value obtained by averaging the error between tracks obtained at the detection pitch in the correction pitch.

10. The method according to claim 8, wherein the detection pitch and the correction pitch are obtained by using the output value of the high-order track as a reference.

11. The method according to claim 8, wherein when both the output value of the high-order track and, the output value of the low-order track are made into a phase amount normalized with the maximum value regarded as 1, the number of the cycles of the low-order track is obtained as a value made into an integral number by rounding off a value obtained by subtracting the output value of the low-order track and the correction value from a value obtained by multiplying the cyclic ratio of the low-order track to the high-order track by the output value of the high-order track.

12. The method according to claim 8, further comprising:

providing a threshold value and an offset value with respect to the error between tracks, and changing the offset value in conjunction with the magnitude of the error between tracks obtained in the last time position detection at least a detection pitch to correct the position in the correction pitch when the error between tracks exceeds the threshold value; and changing the error between tracks by adding the changed offset value to the error between tracks.

13. The method according to claim 12, wherein the magnitude of the error between tracks obtained in the last time position detection is determined by one or more flags.

14. The absolute type linear encoder according to claim 1, wherein a cyclic ratio of the low-order track to the high-order track is increased in order to enlarge the detection distance of the absolute type linear encoder.

15. The method of claim 8, wherein a cyclic ratio of the low-order track to the high-order track is increased in order to enlarge the detection distance of the absolute type linear encoder.

* * * * *